United States Patent [19]

Kurelek

[11] E Re. 29,235

[45] Reissued May 31, 1977

[54] MULTIPLE TREE HARVESTER OF THE FLEXIBLE ARM TYPE

[75] Inventor: John Kurelek, Brantford, Canada

[73] Assignee: Koehring Canada Limited, Brantford, Canada

[22] Filed: Jan. 2, 1976

[21] Appl. No.: 646,001

Related U.S. Patent Documents

Reissue of:

[64] Patent No.: 3,875,983
Issued: Apr. 8, 1975
Appl. No.: 458,327
Filed: Apr. 5, 1974

[52] U.S. Cl. ..... 144/3 D; 144/34 E; 144/309 AC; 214/147 G; 214/330; 294/106

[51] Int. Cl.[2] ..... A01G 23/08

[58] Field of Search ..... 144/2 Z, 3 D, 34 R, 144/34 E, 309 AC; 214/147 G, 147 AS, 330; 294/106

[56] References Cited

UNITED STATES PATENTS

| | | | |
|---|---|---|---|
| 3,238,981 | 3/1966 | Larson et al. | 144/2 Z X |
| 3,363,929 | 1/1968 | Nelson | 294/106 X |
| 3,371,692 | 3/1968 | Larson et al. | 144/309 AC |
| 3,631,995 | 1/1972 | Jones | 294/106 X |
| 3,749,143 | 7/1973 | Hamilton | 144/3 D |
| 3,795,264 | 3/1974 | Coughran, Jr. | 144/34 R X |
| 3,804,453 | 4/1974 | Walden | 294/106 X |
| 3,805,860 | 4/1974 | Smith | 144/309 AC |
| 3,910,326 | 10/1975 | Tucek | 144/3 D X |
| 3,911,981 | 10/1975 | Tucek | 144/3 D X |

*Primary Examiner*—Othell M. Simpson
*Assistant Examiner*—W. D. Bray
*Attorney, Agent, or Firm*—Andrew J. Beck

[57] ABSTRACT

A mobile harvester which is capable of severing trees at their base, one at a time, and gathering trees, one at a time, while the previously accumulated trees are rigidly held together. The harvester has tree gathering means located vertically above a shear blade mechanism and this gathering means includes two pairs of power operated arms which are pivotally mounted so that each pair of arms can be individually and selectively swung between an open, tree receiving position and a closed, tree holding position. One of the pairs of arms holds the accumulated trees while the other pairs of arms gathers subsequently severed trees, one at a time, and brings them into the bundle of previously accumulated trees. Each of the arms of one of the pairs of arms is formed as an inner part pivotally mounted on a support frame and an outer part pivotally mounted intermediate its length to the inner part so that when the pair of arms is shifted to its open position after functioning to hold accumulated trees, the outer parts of the arms can pivot on their inner parts and be withdrawn in generally opposite lateral directions and out from between the accumulated trees and a subsequently severed tree which is held thereagainst by the other pair of arms.

In a modified form of the invention, both pairs of arms are formed as two parts pivoted together, as above mentioned, so that each pair can be used to either gather a newly cut tree or hold the accumulated trees.

15 Claims, 13 Drawing Figures

MULTIPLE TREE HARVESTER OF THE FLEXIBLE ARM TYPE

Matter enclosed in heavy brackets [ ] appears in the original patent but forms no part of this reissue specification; matter printed in italics indicates the additions made by reissue.

BACKGROUND OF THE INVENTION

Various mobile tree harvesting devices have been proposed and used with a certain degree of success and these include harvesters for handling a plurality of trees. One of the shortcomings of these prior art devices however, resides in their inability to hold individual severed trees in a positive manner and at the same time, successively gather additional trees and bunch them together with the previously accumulated trees. One example of a prior art multiple tree harvester is shown in the U.S. Pat. No. 3,371,692 isued Mar. 5, 1968 to Larson et al. and entitled "Method for Harvesting Trees". That patent and its parent U.S. Pat. No. 3,238,981 show a device which encircles and tightly grips a plurality of trees about their upper portions to bring them into contact relationship with one another to form a cluster and then cutting those trees at their bases and continuing to grasp all of the trees and then clamping the trees adjacent the cut ends thereof and delimbing the cluster of trees. In other words, that harvester does not individually gather the trees and cannot hold the accumulated, cut trees while other individual trees are being gathered and cut and then bunched together with the previously accumulated trees.

Another example of a prior art, multiple tree harvester is shown in U.S. Pat. No. 3,795,264 issued Mar. 5, 1974 and entitled "Tree Accumulating Attachment for a Tree Harvester". That device shows an accumulator which has tree receiving means that permits the tree trunk to be advanced therethrough and which is detailed in dimension for engaging and retaining a plurality of tree trunks. That device however cannot positively hold the accumulated trees while the subsequent tree being gathered is positively grasped and held and then moved into engagement with the accumulated trees, while the accumulated trees are continued to be grasped in a secure manner.

SUMMARY OF THE INVENTION

The present invention provides a multiple tree harvesting mechanism having two pairs of movably mounted arms for cooperating with one another to gather a plurality of trees, one at a time. Both pairs of arms are selectively power operated and movable between an open tree receiving position and a closed, tree holding position, one pair of arms being operative to gather a newly cut tree while the other pair of arms securely holds the previously accumulated trees.

Specifically, the invention relates to the feature of having either one or both pairs of arms made of two parts to provide flexible, jointed arms that can be withdrawn generally laterally in opposite directions and out from between the accumulated trees and the newly gathered tree, while permitting one pair of arms to securely hold all of the trees. In this manner, the accumulated trees are always held firmly together and without releasing the holding force on the trees, because one pair of arms can be easily moved laterally from their closed position (in which they have been holding the accumulated trees) and laterally out of the way so that the other pair of arms can add a subsequent tree to the accumulated trees.

These and other objects and advantages of the present invention will appear hereinafter as this disclosure progresses, reference being had to the accompanying drawings.

DESCRIPTION OF A PREFERRED EMBODIMENT

GENERAL

The present invention relates to a mobile tree harvester which is capable of accumulating a plurality of trees, one at a time, and which is also capable of securely holding all of the accumulates trees while additional trees are cut and gathered with the previously accumulated trees.

The invention includes the use of two pairs of power operated, movable arms, the pairs of arms being selectively and individually operable and movable between a tree receiving open position and a closed, tree holding position. One pair of arms acts to hold the accumulated trees and while the other pair of the arms acts to gather an additional tree and deliver it into engagement with the previously accumulated trees. Positive control of all of the trees at all stages of the operation is insured.

Figure 1:
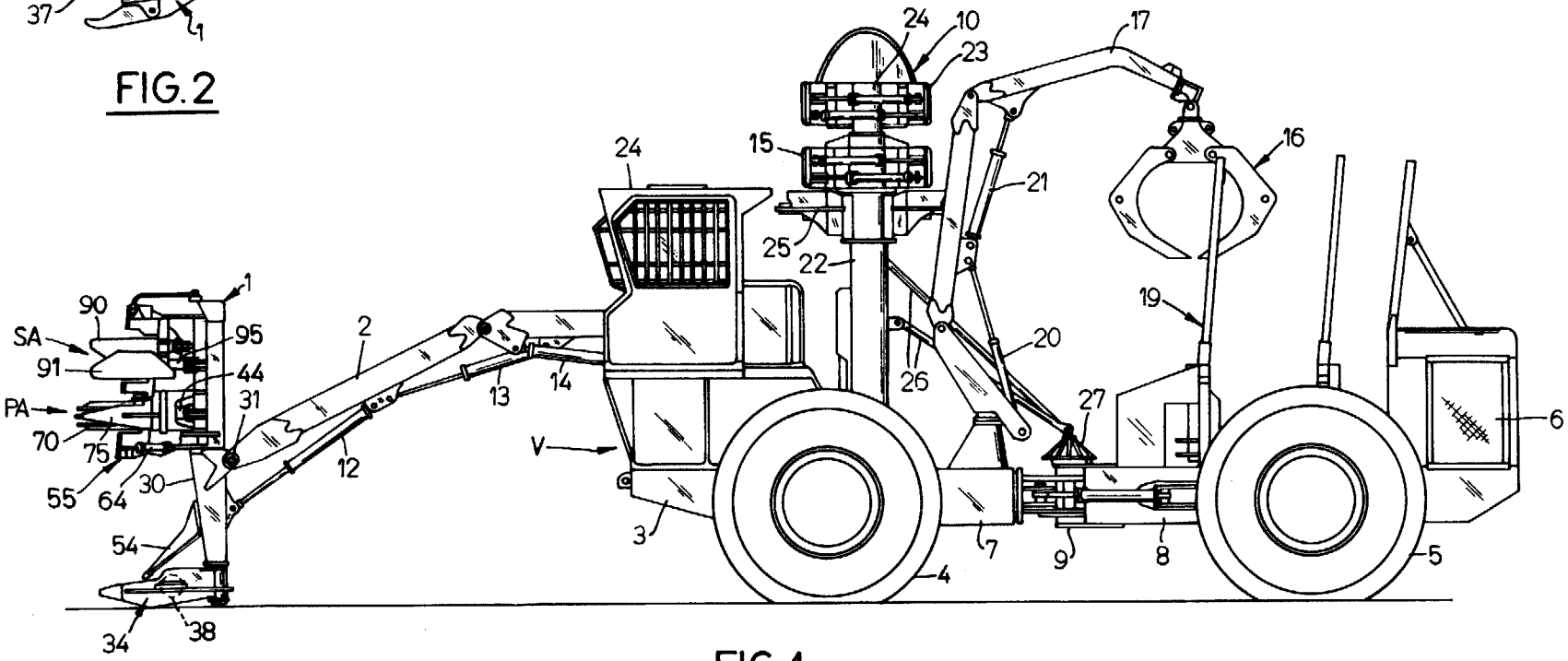
FIG. 1 is a side elevational view of a tree harvester embodying the present invention.
Figure 3:
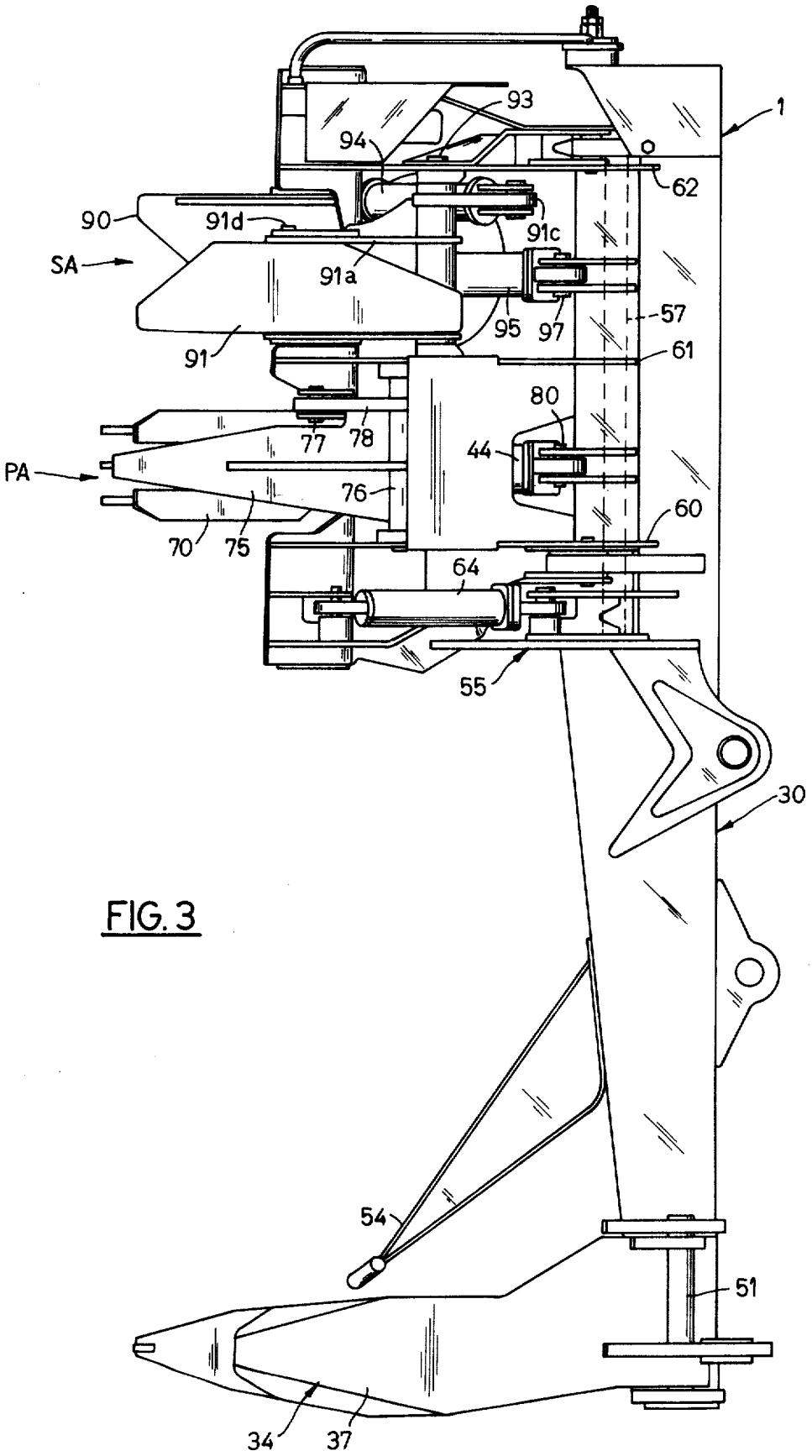
FIG. 3 is an enlarged side elevational view of the cutting and gathering apparatus shown at the front end of the vehicle in FIG. 1.

The mobile device V shown in FIGS. 1 and 3 includes a tree cutting and gathering mechanism 1 located at the forward end of the tree boom 2 which in turn is pivotally attached to the main frame 3 of the vehicle so that the cutting and gathering mechanism 1 can be vertically positioned as well as swung in a generally horizontal direction. The vehicle itself is conventional in character, and is ground supported by the pairs of wheels 4 and 5, which receive their power in the conventional manner from a power source 6. The frame or chassis of the vehicle includes a front chassis portion 7 and a rear chassis portion 8 which are articulated about the vertical pivot 9.

The vehicle also includes a tree processing tower 10 extending upwardly and to which the cut, accumulated trees are conveyed by the cutting and gathering mechanism 1. For that purpose, suitable hydraulic cylinders 12, 13, and 14, for example, are used to vertically and horizontally position the mechanism 1 so as to be able to deliver the accumulated trees as a unit to the processing tower 10 and held by clamps 15.

The processing tower 10 includes a center mast 22 (FIG. 1) having a delimber 23 mounted on a telescoping inner member 24 within mast 22 so that the delimber can be vertically positioned and move upwardly over the tree being processed to remove the limbs and also perform a debarking function. The processing tower also includes a log shear 25 that acts to cut, i.e., "buck" the tree, if a bucking operation is to be performed, into proper lengths, say for example into 100 inch bolts. Otherwise the cut tree may be left in its full length.

The logs (bolts) are then delivered by the log guides 26 and cone-like transfer rollers 27 to the storage means which takes the form of a cradle 19. The load of cut bolts is built within the cradle from below.

TREE ACCUMULATING MECHANISM

Figure 2:
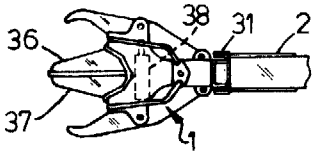
FIG. 2 is a plan view of the cutting and gathering apparatus shown on the outer tree boom of the harvester shown in FIG. 1.

Referring now in greater detail to the cutting and gathering mechanism 1, a vertically extending support frame 30 is pivotally attached at 31 to the outer end of the boom 2. The previously mentioned hydraulic cylinder 12 is connected between the boom 2 and the support frame 30 so as to swing the mechanism 1 about the pivot point 31. At the lower end of the frame 30, the power operated shear 34 is provided for shearing the trees adjacent the ground. As shown in FIG. 2, for example, the shear 34 includes the opposed blades 36 and 37 each of which are swingable between a closed position shown in FIG. 2 and an open position. These blades are power operated by the hydraulically operated double acting cylinder unit 38 (FIGS. 1, 2 and 13) under the influence of a pilot operated control valve 39. Pressurized fluid is delivered from the pump P via conduit 40 (FIG. 13) through the shiftable valve 39 and through conduits 41 and 42 to the tree shear cylinder unit 38. Conduits 41 and 42 also extend to the primary tree clamp cylinder unit 44 for simultaneous actuation thereof. When the valve 39 is shifted to the left as viewed in FIG. 13, fluid pressure is released from the head end of the double acting cylinder units 38 and 44 and returned to the sump 45, and pressure fluid in conduit 41 then pressurizes the rod end of cylinder units 38 and 44. Conventional pressure relief valves are also provided in the circuit as indicated, but a description of them is not believed necessary. The pilot operated valve 39 is shifted by the operator actuated, conventional pilot valve 46 which directs fluid pressure from a remote source 47 and through either conduit 48 or 49.

The shear unit 34 is stationarily mounted on the lower end of the support frame 30. Blades 36 and 37 are pivoted on shaft 51. A tree stop member 54 is provided directly above the blades 36 and 37 so that a tree to be severed abuts against the stop 54 as the blades 36 and 37 are closed under power by the shear cylinder unit 38.

Figure 12:
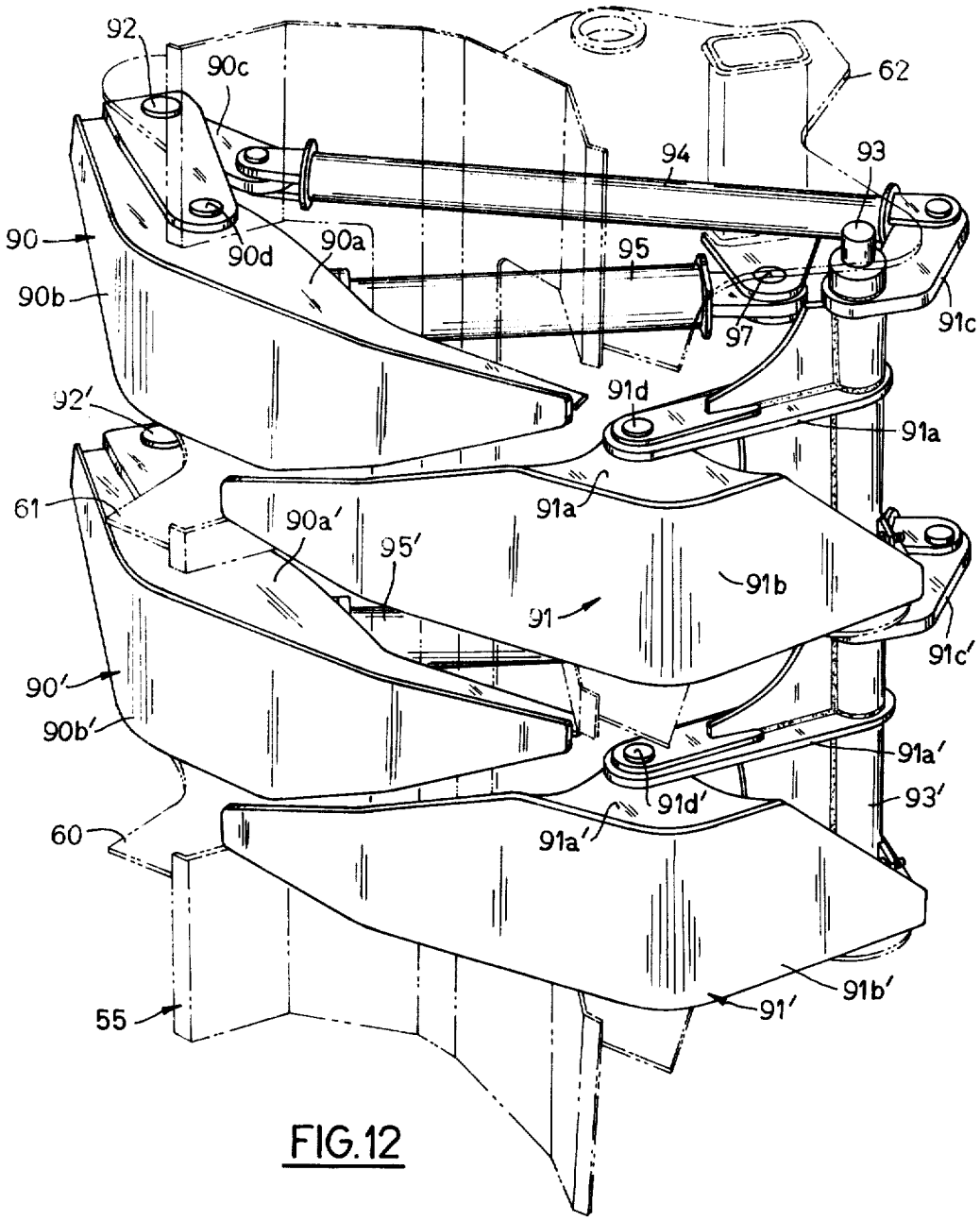
FIG. 12 is a view similar to FIG. 4, but a modification wherein both pairs of arms are of the flexible type.

At the upper end of the support frame 30, a sub-frame 55 is horizontally swingable about a vertical shaft 57 which is mounted in the upper portion of the support frame 30. The sub-frame 55 includes a series of vertically spaced and horizontally disposed plates 60, 61, and 62 (FIGS. 4, 5 and 12) which are rotatable on the shaft 57. A pair of hydraulic cylinder units 64 and 65 (FIGS. 1, 3 and 13) are connected between the sub-frame 55 and the support frame 30 so that the entire sub-frame 55 and its associated pairs of arms, to be described, can be swung in a generally horizontal direction. A fluid flow control valve 67 directs pressure fluid from a constant pressure source 68 and through either of the conduit 69 or 70 so as to either selectively extend or contract the cylinder units 64 and 65, thus swinging the sub-frame 55 and its pairs of arms in a horizontal direction.

The constant source of fluid pressure 68 is preferably a constant pressure pump which insures continued application of pressure on the pairs of arms now to be described.

Two pairs of arms are pivotally mounted on the sub-frame 55 and one of these pairs will be referred to as the primary arms PA and a pair of secondary arms SA and these are shown in greater detail in FIGS. 4, 5 and 6–11. Both pairs of arms are shown in various positions in FIGS. 6 to 11.

More specifically, the pair of primary arms PA include an arm 70 pivoted to and between the sub-frame plates 60 and 61 at 71. Arm 70 includes a crank portion 72 rigidly fixed therewith and having a tie rod 73 pivoted thereto at 74. The other arm 75 of the primary arms is pivoted to a sub-frame plate at 76 and also has a crank member 77 fixed therewith. The tie rod 73 is then connected at 78 to the crank arm 77, thus typing the arms 70 and 75 together for coordinated swinging movement, as will appear.

Figure 4:
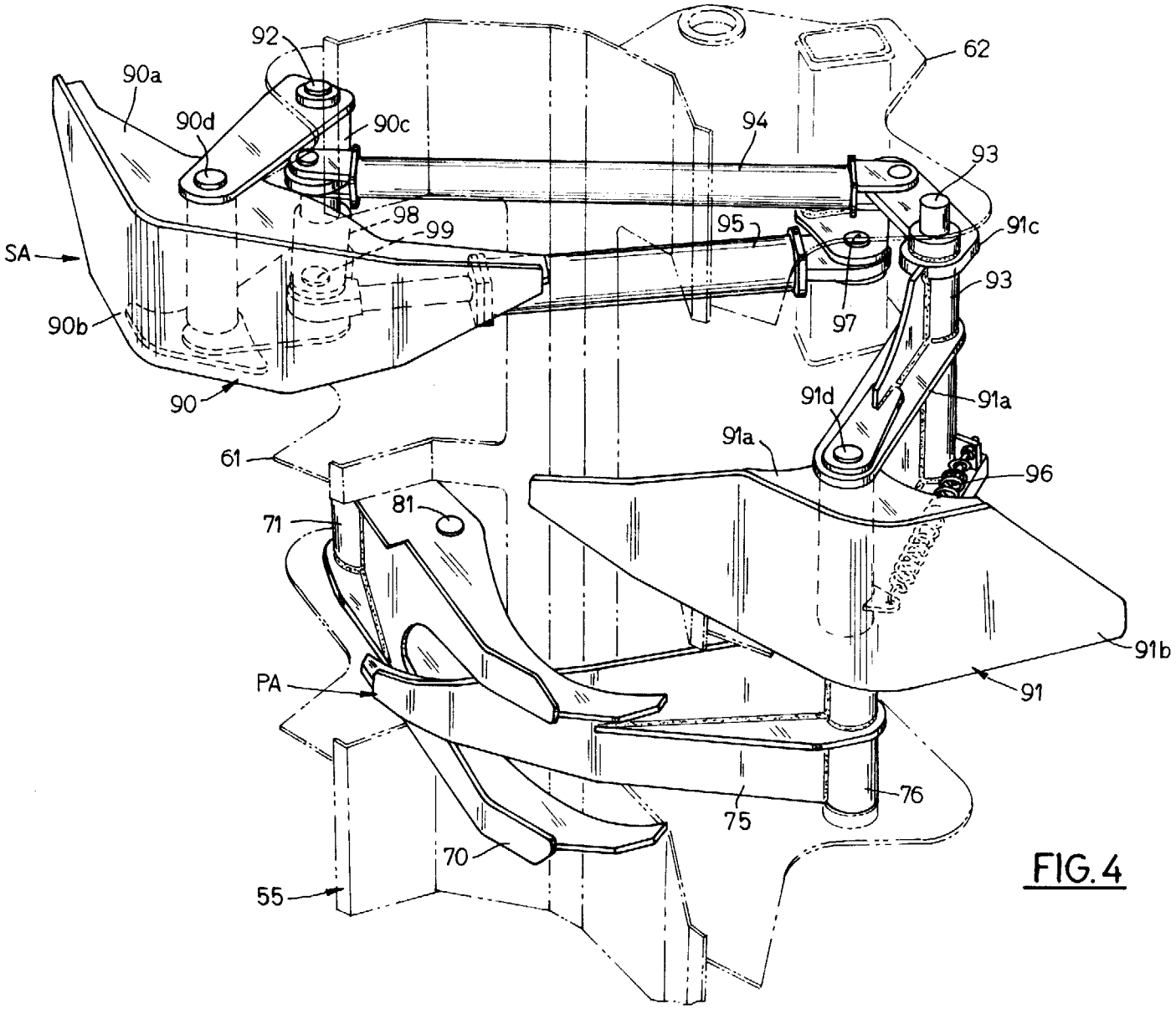
FIG. 4 is an enlarged, perspective view, some parts being shown in phantom and dotted lines, and showing the primary arms in closed position and the secondary, flexible arms in the open position.
Figure 5:
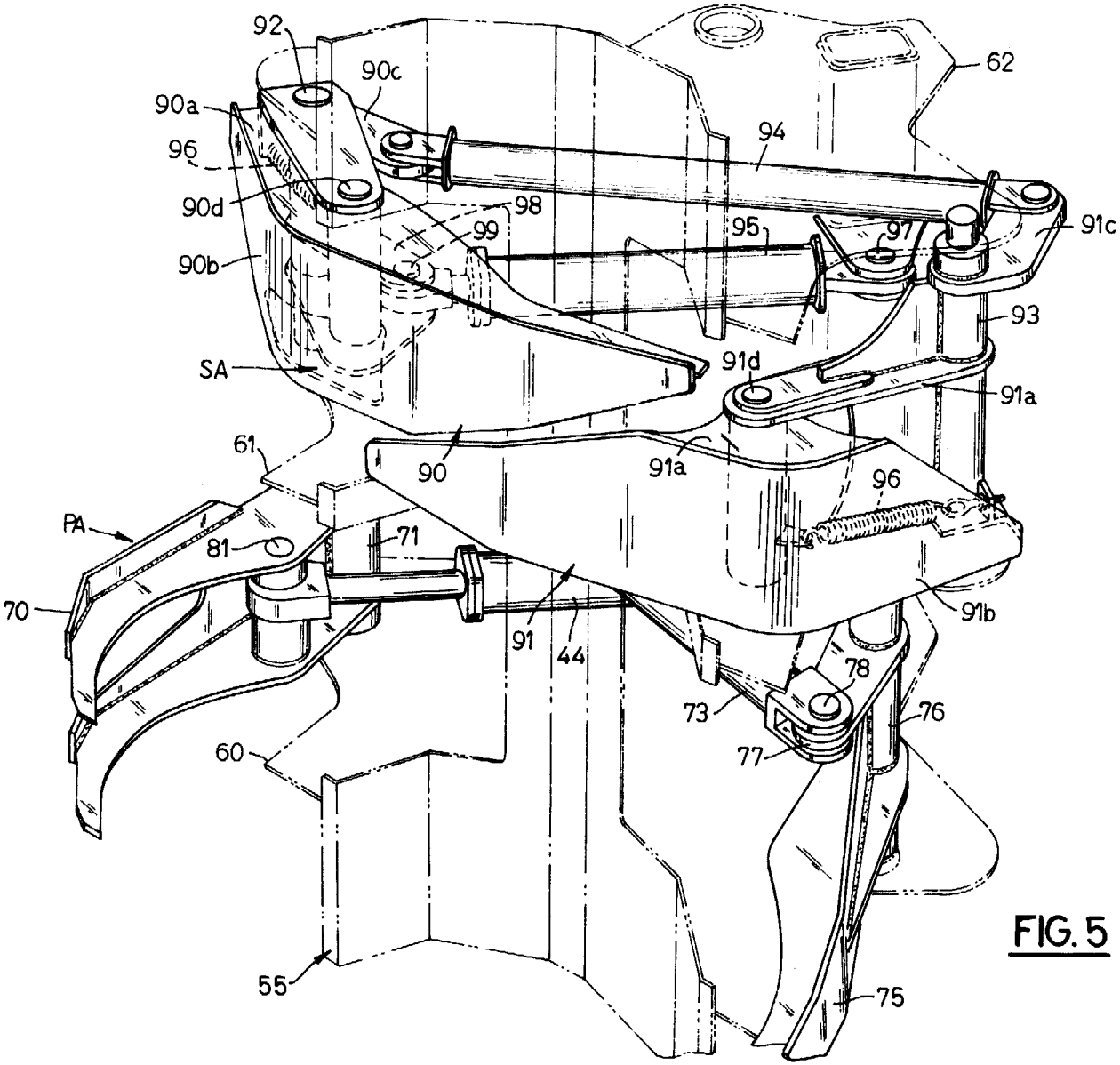
FIG. 5 is a view similar to FIG. 4, but showing the primary arms in an open position, and the secondary arms in the closed position.
Figure 8:
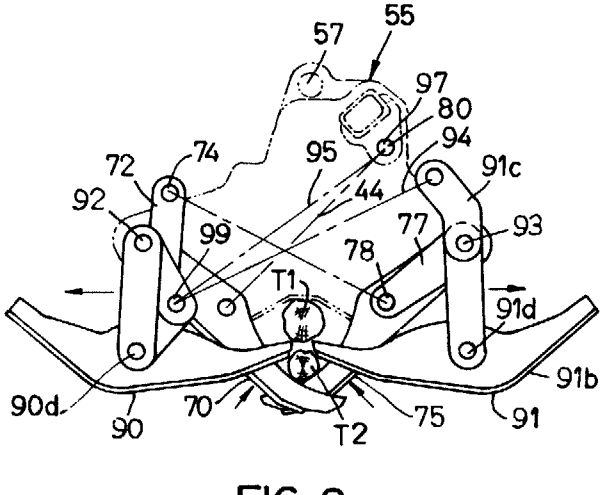
FIGS. 6–11 are fragmentary plan views of the primary and secondary arms and showing a sequence of operation for gathering and cutting a plurality of trees.

The primary tree clamp cylinder unit 44 previously referred to, (FIGS. 5 and 13) is pivoted at 80 to the sub-frame and is also pivoted at 81 to arm 70. Extension or contraction of the double acting cylinder unit 44 causes the arms to swing together to an open, tree receiving position as shown in FIG. 5, or the closed, tree holding position as shown in FIG. 4.

Referring now to FIGS. 4, 5, 6–12, the pair of secondary arms SA include the compound arm 90 having an inner part 90a and an outer part 90b. The other secondary arm 91 is comprised of an inner part 91a and an outer part 91b. The inner parts of the arms 90a and 91b are pivoted to the sub-frame at 92 and 93, respectively. The inner parts have a crank arm 90c and 91c which are connected together by a tie link 94. The outer members 90b and 91b are pivoted to their respective inner members intermediate their length, as at 90d and 91d, respectively. It will be noted that the other members are wedge shaped, that is they taper to a narrower portion at their inner ends. Suitable tension springs 96 are connected between the outer arms and the sub-frame so as to tend to urge them in a direction wherein their inner tips are biased outwardly.

The secondary arms SA are swingably mounted in unison due to the tie link 94 by means of a double acting hydraulic cylinder unit 95 which is pivotally connected at 97 to the sub-frame 55 and to a crank shaft 98 of one of the arms, as at 99.

The cylinder unit 95 is actuated by the control valve 102 (FIG. 13) which directs fluid pressure from conduit 103 to either conduit 104 and 105 to consequently extend or retract the cylinder unit 95.

With the above construction of the arms, the compound secondary arms are flexible in nature, that is the outer part is pivotally mounted so that it can be withdrawn laterally from between the trees and without causing the primary arms to open up or release and hold on the arms as will appear. Thus, the outer parts 90b and 91b of the arms have in effect elbows and these compound arms can thus be withdrawn from between the tree without necessitating the primary arms to loose their firm hold on the trees. Thus, this one-way flexibility for the outer parts of the compound arms permits them to be laterally withdrawn from between accumulated trees and subsequent trees being clamped thereagainst by the other set of arms. The wedge or tapered inner tips of the outer parts of the arms avoids the undesirable arcing of the tips of conventional arms when they are being withdrawn.

OPERATION

FIGS. 6–11 illustrate the sequencing operating of the two pairs of arms when gathering and accumulating trees, one at a time.

Figure 6:
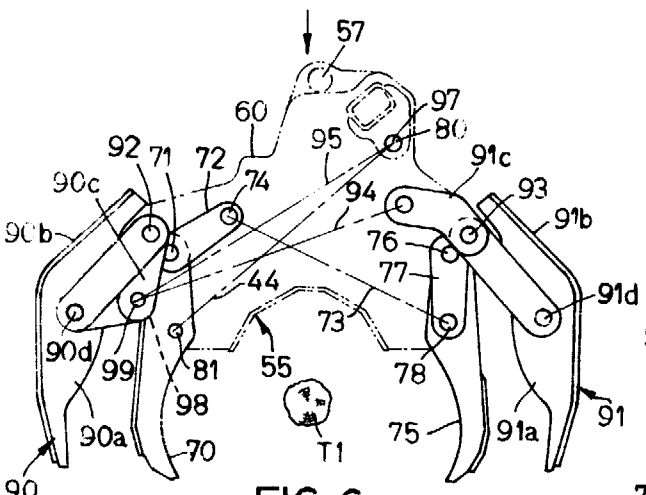

As shown in FIG. 6, the first tree T1 is approached when the harvester moves in the direction indicated by the arrow. When the harvester has moved to a position where tree T1 is in the position shown in FIG. 7, one pair of arms is swung to the closed position by its hydraulic cylinder unit and the shear blades are then operated to sever the tree from the ground.

Figure 7:
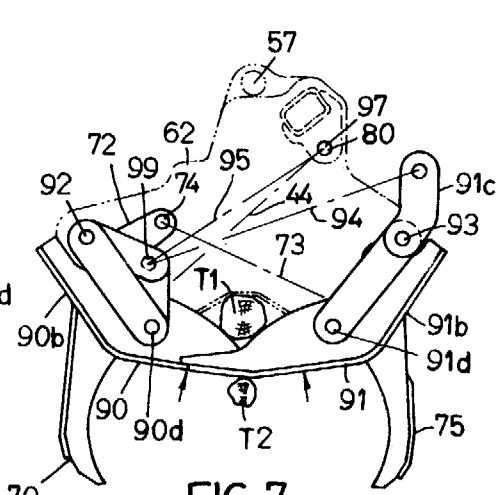

As shown in FIG. 7, the harvester is then moved to a position where a second tree T2 bears against the outer side of the arms that clamp tree T1 and the other set of arms 70, 71 are in an open position where they can then encircle tree T2. After the shear blades then shear the tree T2 from the ground, the flexible arms are moved in the direction indicated by the arrow, that is in a generally laterally outward direction. This is facilitated because the outer parts of the arms are pivotally mounted on the inner parts of the arms and can flex to the position shown in FIG. 8 where they are easily withdrawn from between the accumulated tree T1 and the subsequent tree T2 bearing against the outside of the flexible arms.

Figure 10:
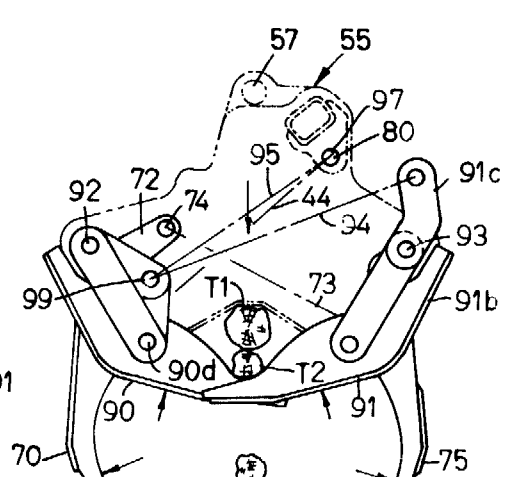
Figure 9:
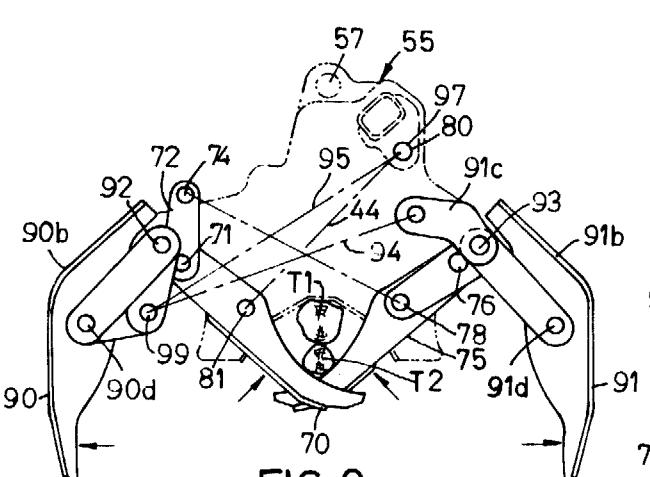

As shown in FIG. 9, two trees T2 and T3 are then held by the primary arms while the flexible arms are then used to again swing around both trees as shown in FIG. 10.

Figure 11:
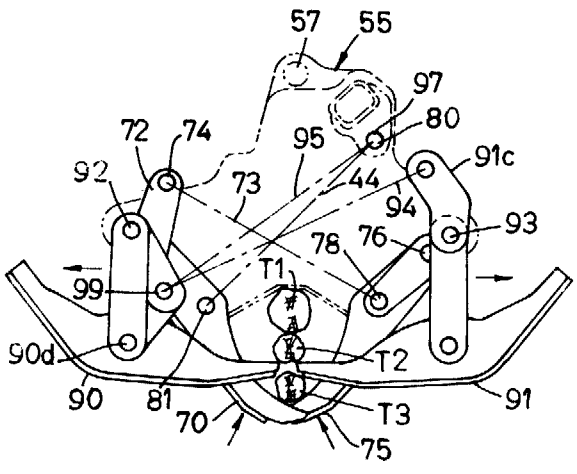

The primary arms are then moved to the open position to gather a third tree T3. As shown in FIG. 11, the flexible arms are again withdrawn laterally from between the accumulated trees T1 and T2 so that tree T3 can be grasped with the first two harvested trees.

The above process can be repeated up to the holding capacity of the arms. At that time they are delivered by the power operated boom to the tree processing tower 10.

Figure 13:
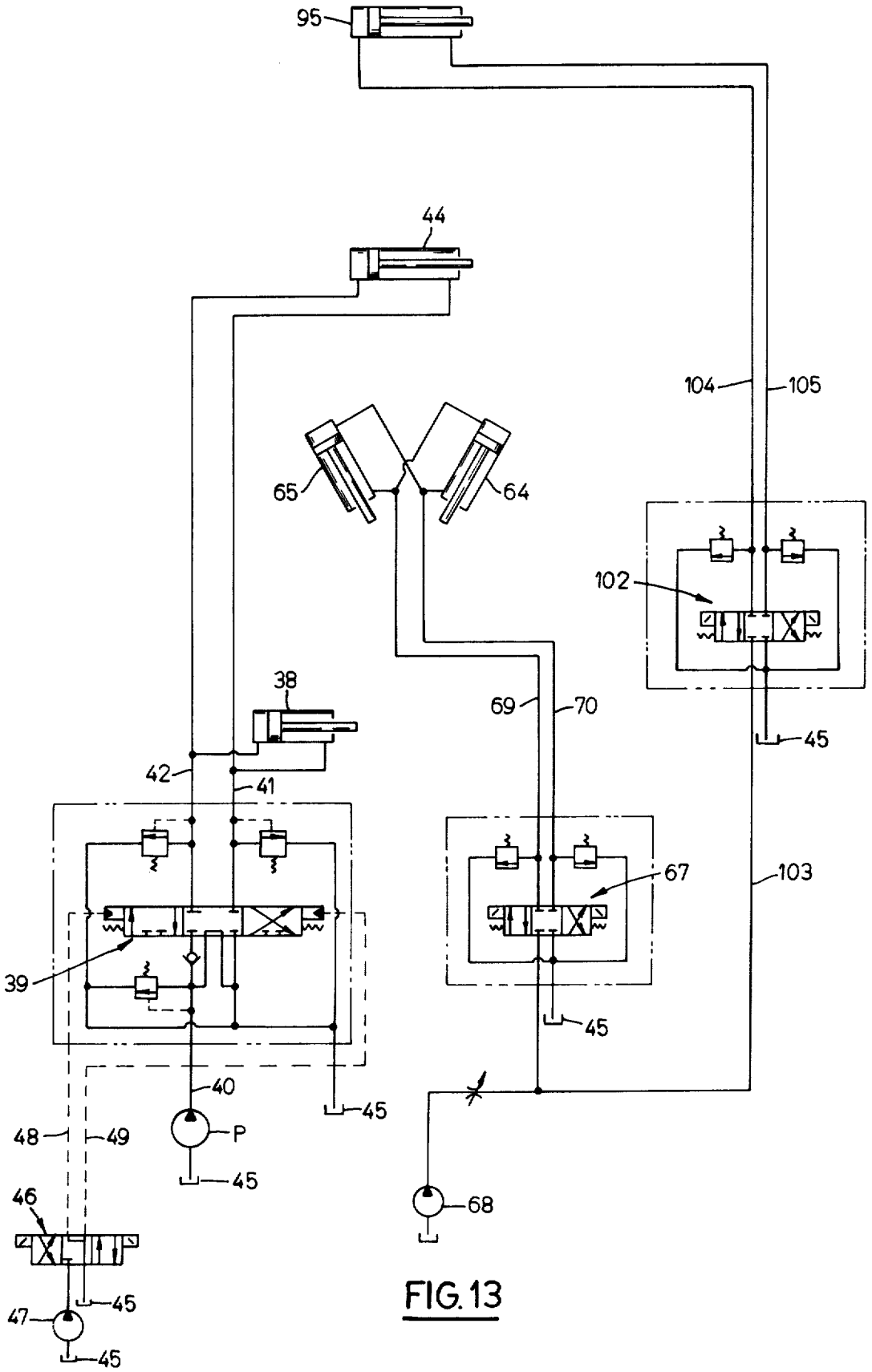
FIG. 13 is a hydraulic circuit used with the present invention.

The modification shown in FIG. 13 is of the type wherein both pairs of arms are made compound. The second set of flexible arms have been referred to with similar reference characters together with a prime designation. The operation of these arms is as above described, and either set of arms can be used to both gather the trees initially and hold the accumulated trees while the other pairs of arms does the gathering. The constant pressure pump 68 insures continual holding pressure on the arms to permit take-up of slack in the bundle of accumulated trees, for example, as the tips of the arms are withdrawn or the trees rearrange themselves while being handled.

With the present invention, a multiplicity of trees can be harvested, one at a time, while the previously accumulated trees are securely held. One pair of arms acts to hold the accumulated trees and can be open or withdrawn generally laterally so as to permit the entry of an additional tree due to the clamping action of the other arms.

It will be understood that various means can be used to cut the trees and while shear blades have been shown and described, other cutting means can be used, such as an endless chain saw or other cutting means.

I claim:

1. A multiple tree harvester for cutting and accumulating trees, one at a time, said harvester having a support frame, a first pair of arms and a second pair of arms movably mounted on said support frame for cooperating to gather a plurality of trees, one at a time, said pairs of arms being vertically spaced apart on said support; said pairs of arms being movable between an open, tree receiving position and a closed, tree holding position; power means attached to each of said pairs of arms and for selectively moving each of said pairs of arms between their open tree receiving position and their closed, tree holding position; each of the arms of at least one of said pair of arms having an inner part movably mounted on said support frame and having a free end, and an outer part pivotally mounted generally intermediate its length to said inner part adjacent a free end thereof, whereby when said one of said pairs of arms is moved to its said open position, said outer parts can pivot on their said inner parts and thereby be withdrawn in generally opposite lateral directions and out from between an accumulated tree and a succeeding tree clampingly engaged thereagainst by the other pair of arms; and power operated tree severing means located generally below said arms for severing said trees which are to be accumulated.

2. The harvester of claim 1 further characterized in that adjacent ends of said arm outer portions are tapered to facilitate their said withdrawal.

3. The harvester set forth in claim 1 further characterized in that said power means includes a hydraulically operated cylinder unit for each of said pairs of arms, and control means for individually and selectively operating each of said hydraulically operated cylinder units.

4. The harvester set forth in claim 2 further characterized in that said power means includes a hydraulically operated cylinder unit for each of said pairs of arms, and control means for individually and selectively operating each of said hydraulically operated cylinder units.

5. The harvester set forth in claim 1 including a mobile, self-propelled chassis, a power operated boom pivotally mounted on said chassis and having a free end for vertical and horizontal swinging relative to said chassis, said support frame being pivotally mounted on said free end.

6. The harvester set forth in claim 3 including a mobile, self-propelled chassis, a power operated boom pivotally mounted on said chassis and having a free end for vertical and horizontal swinging relative to said chassis, said support frame being pivotaly mounted on said free end.

7. The harvester set forth in claim 1 further characterized in that both pairs of arms have said inner and outer parts pivotally secured together.

8. The harvester set forth in claim 1 wherein the power means for said one of said pairs of arms having inner and outer parts is operative to hold its arms in said closed position to thereby hold a first tree, said power means for said other set of arms then being operative to open its arms to said tree receiving position and shift its arms to embrace and clamp a second tree against said one of said pairs of arms, and then said power means for said one of said pair of arms is operative to shift its arms and said outer parts move in generally lateral direction away from one another and from between said first and second trees and to its said open position, whereby said power means for said other pair of arms can cause the latter to clampingly engage both of said trees.

9. A mobile and self-propelled multiple tree harvester for cutting and accumulating trees, one at a time, said harvester having a chassis and a power operated boom shiftably mounted on said chassis and having a free end, a support frame pivotally mounted on said free end, a first pair of arms and a second pair of arms movably mounted on said support frame for cooperating to gather a plurality of trees, one at a time, said pairs of arms being vertically spaced apart on said support; said pairs of arms being movable between an open, tree receiving position and a closed, tree holding position; a hydraulically operated cylinder unit attached to each of said pairs of arms and for selectively moving each of said pairs of arms between their open tree receiving position and their closed, tree holding position; fluid flow control means communicating with said cylinder units for individually operating each of said cylinder units; each of the arms of at least one of said pair of arms having an inner part pivotally mounted on said support frame and having a free end, and an outer part pivotally mounted generally intermediate its length to said inner part free end, whereby when said one of said pairs of arms is moved to its said open position, said outer parts can pivot on their said inner parts and thereby be withdrawn in generally opposite lateral directions and out from between an accumulated tree and a succeeding tree clampingly engaged thereagainst by the other pair of arms, the adjacent ends of said arm outer portions are tapered to facilitate their said withdrawal; and power operated tree severing means located generally below said arms for severing trees.

10. A tree gathering and accumulating mechanism for a multiple tree harvester for accumulating trees, one at a time, said mechanism comprising, a vertically disposed support frame, a first pair of arms, and a second pair of arms movably mounted on said support frame for cooperating to gather a plurality of trees, one at a time, said pairs of arms being vertically spaced apart on said support; said pairs of arms being movable between an open, tree receiving position and a closed, tree holding position; power means attached to each of said pairs of arms and for selectively moving each of said pairs of arms between their open tree receiving position and their closed, tree holding position; each of the arms of at least one of said pair of arms having an inner part pivotally mounted on said support frame and having a free end, and an outer part pivotally mounted generally intermediate its length to said inner part free end, whereby when said one of said pairs of arms is moved to its said open position, said outer parts can pivot on their said inner parts and thereby be withdrawn in generally opposite lateral directions and out from between an accumulated tree and a succeeding tree clampingly engaged thereagainst by the other pair of arms.

11. The mechanism of claim 10 including power operated tree severing means located generally below said arms for severing said trees which are to be accumulated.

12. The harvester set forth in claim 10 wherein the power means for said one of said pairs of arms having inner and outer parts is operative to hold its arms in said closed position to thereby hold a first tree, said power means for said other set of arms then being operative to open its arms to said tree receiving position and shift its arms to embrace and clamp a second tree against said one of said pairs of arms, and then said power means for said one of said pair of arms is operative to shift its arms and said outer parts move in generally lateral direction away from one another and from between said first and second trees and to its said open position, whereby said power means for said other pair of arms can cause the latter to clampingly engage both of said trees.

13. A mobile self-propelled multiple tree harvester for cutting and accumulating trees, one at a time, said harvester having a chassis, a power operated boom pivotally mounted on said chassis and having a free end for vertical and horizontal swinging relative to said chassis, a support frame pivotally mounted on said free end, a primary pair of arms and a secondary pair of arms movably mounted on said support frame for cooperating to gather a plurality of trees, one at a time, said pairs of arms being vertically spaced on said support and from one another; said pairs of arms being movable between an open, tree receiving position and a closed, tree holding position; power means attached to each of said pairs of arms and for selectively moving each of said pairs of arms between their open tree receiving position and their closed, tree holding position, each of the arms of at least one of said pair of arms having an inner part movably mounted on said support frame and having a free end, and an outer part pivotally mounted generally intermediate its length to said inner part adjacent a free end thereof, whereby when said one of said pairs of arms is moved to its said open position, said outer parts can pivot on their said inner parts and thereby be withdrawn in generally opposite lateral directions and out from between an accumulated tree and a succeeding tree clampingly engaged thereagainst by the other pair of arms; and power operated tree severing means located on and adjacent the lower end of said support frame for severing trees.

14. The harvester set forth in claim 13 further characterized in that both pairs of arms have said inner and outer parts pivotally secured together.

*15. A tree gathering and accumulating mechanism for accumulating trees, one at a time, said mechanism comprising, a support frame, a first pair of arms and a second pair of arms movably mounted on said support frame for cooperating to gather a plurality of tress, one at a time, said pairs of arms being spaced apart on said support; said pairs of arms being movable between an open, tree receiving position and a closed, tree holding position; power means attached to each of said pairs of arms and for selectively moving each of said pairs of arms between their open tree receiving position and their closed, tree holding position; each of the arms of at least one of said pair of arms having an inner part pivotally mounted on said support frame and having a free end, and an outer part pivotally mounted generally intermediate its length to said inner part free end, whereby when said one of said pairs of arms is moved to its said open position, said outer parts can pivot on their said inner parts and thereby be withdrawn in generally opposite lateral directions and out from between an accumulated tree and a succeeding tree clampingly engaged thereagainst by the other pair of arms.*

* * * * *